Nov. 8, 1966  J. W. RICH  3,284,122
SHOCK ABSORBING BUFFER
Filed Dec. 22, 1964

INVENTOR.
JOHN W. RICH

BY Kimmel, Crowell & Weaver
ATTORNEYS.

United States Patent Office 3,284,122
Patented Nov. 8, 1966

3,284,122
SHOCK ABSORBING BUFFER
John W. Rich, 3224 Churchill Road, Sacramento, Calif.
Filed Dec. 22, 1964, Ser. No. 420,314
5 Claims. (Cl. 293—1)

This invention relates to a shock proof buffer assembly, and has as its primary object the provision of an improved fluid-filled resilient bumper for vehicles such as motor cars or trucks so arranged as to permit the escape of a portion of the fluid upon impact against the bumper or buffer so that the shock to the vehicle is materially reduced by the yielding of the bumper gradually against a loss of fluid.

A further object of the invention is the provision of a bumper of this character which, when impacted, permits the water filled resilient bumper to absorb the original shock by simultaneously with the impact, opening a closure member to release a portion of the fluid contained in the bumper relatively slowly, so that the effect is that of yielding with the blow, rather than having the direct shock imparted through a normally rigid bumper to the vehicle and the occupants thereof.

A further object of the invention is the provision of a bumper of this character wherein means are provided for attaching the same to the conventional bumper of a motor vehicle or a correspondingly positioned extension of the frame, and wherein the fluid-filled bumper has a projecting or extending portion extending over the conventional bumper, openings being provided in this latter portion, and pressure releasable plugs in the openings, which are released upon increase of pressure in the fluid contained in the bumper occasioned by an impact.

A further object of the invention is the provision of a bumper of this character wherein the openings are relatively restricted compared to the overall area of the bumper, so that the fluid may be discharged relatively slowly to compensate for the impact against the bumper, and cause the shock to be transmitted to the vehicle relatively slowly.

A further object of the invention is the provision of a bumper of this character so arranged that a plurality of bumpers may be aligned, longitudinally of the path of travel of the vehicle, and either on the front or rear thereof, so that successive shock reducing members are provided between the point of impact and the vehicle per se.

A further object of the invention is the provision of a device of this character which is sturdy and durable in construction, reliable and efficient in operation, relatively simple and inexpensive to manufacture, and easy to attach to any existing vehicle.

Other objects reside in the combinations of elements, arrangements of parts, and features of construction, all as will be more fully pointed out hereinafter and disclosed in the accompanying drawing wherein there is shown a preferred embodiment of this inventive concept.

In the drawings.

Similar reference characters refer to similar parts throughout the several views of the drawing.

Figure 1:
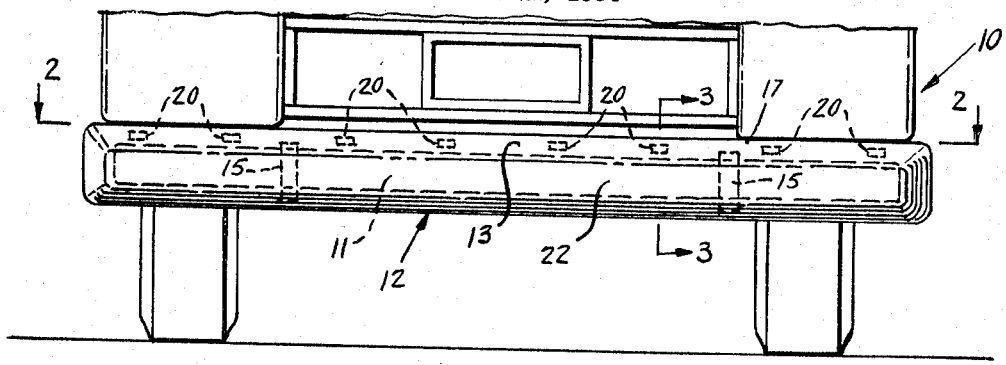
FIGURE 1 is a fragmentary rear elevational view of a motor vehicle showing the bumper of the instant invention attached thereto.
Figure 2:
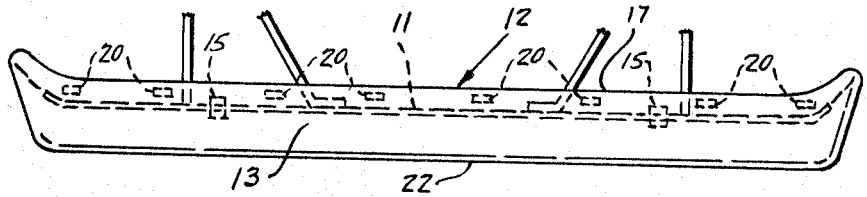
FIGURE 2 is a top plan view, taken substantially along the line 2—2 of FIGURE 1 as viewed in the direction indicated by the arrows.
Figure 3:
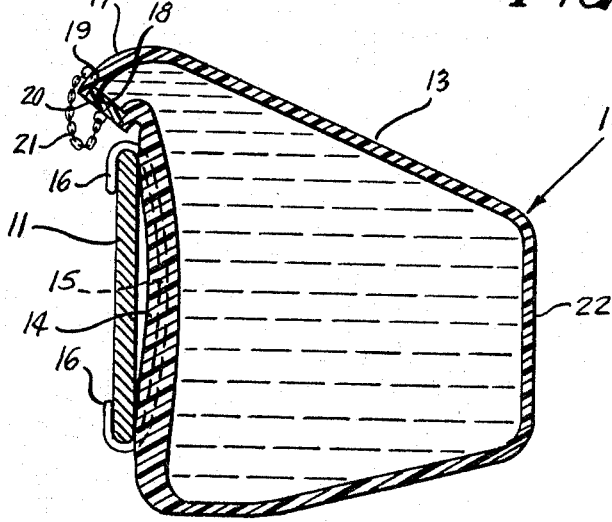
FIGURE 3 is an enlarged sectional view taken substantially along the line 3—3 of FIGURE 1 as viewed in the direction indicated by the arrows.

Having reference now to the drawings in detail, there is generally indicated at 10 the rear end of a motor vehicle such as an automobile, which is provided with a conventional rear bumper 11. While the rear bumper is here shown, it is to be understood that the invention may be applied equally advantageously to the front bumper of the vehicle or, alternatively, in new car construction, to a backing plate secured to the vehicle frame in a position and in a manner corresponding to that of the usual bumper. The device of the instant invention is generally indicated at 12, and comprises an elongated hollow tubular member 13, which is preferably comprised of relatively stiff rubber or similar resilient material. The inner or rear wall 14 of the tubular member is thickened, and has inserted therein, preferably during manufacture, a plurality of metal strips 15 having reverted ends 16, which are adapted to engage over the conventional bumper or alternative backing plate 11. Two or more of these brackets may be provided in the bumper, or, if desired, other suitable means for connecting the resilient tube to the conventional bumper may be employed.

The top portion of tubular bumper 13 has an inwardly extending flange or projection 17, which overlies the brackets 15 and the bumper 11, and which is provided on its underside with a plurality of downwardly inclined openings 18. The openings 18 are provided with shoulders 19, which serve as stop means for closure plugs or stoppers 20, the stoppers preferably being connected by chains 21 to the bumper, to prevent loss thereof when accidentally released.

The arrangement is thus such that when the bumper is struck by an oncoming vehicle, or when the vehicle carrying the bumper strikes an object, the impact is transmitted from the outer face or edge 22 of the bumper directly to the water or other fluid filling the same. The initial shock causes an increase in fluid pressure within the bumper by denting the bumper to decrease the fluid capacity thereof which forces one or more of the stopper plugs 20 out of their associated openings. The effect is thus to force a certain amount of water out of the relatively restricted openings, thus cushioning the impact against the bumper. The quantity of water forced out is in direct proportion to the severity or force of the impact, so that a constant yielding and cushioning effect is produced until the momentum of the striking vehicle has been resolved completely. By virtue of this arrangement the shock to the vehicle carrying the bumper, and consequently to the occupants thereof, is retarded, and hence materially reduced in severity.

If desired a plurality of the bumpers may be attached transversely of the vehicle in horizontal longitudinal alignment, so that the impact of one bumper may be then transmitted to the next, after a certain amount of fluid has been exhausted from the first bumper, thus still further reducing the impact shock.

From the foregoing it will now be seen that there is herein provided an improved shock proof bumper construction which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. A shock proof buffer assembly comprising a relatively rigid backing plate consisting of an extending portion of the frame of a standard motor vehicle, an elongated hollow body member comprised of a resilient material of sufficient rigidity normally to retain a predetermined shape, and of sufficient strength to resist rupture upon impact thereagainst, means on one longitudinal edge of said body member securing said member to said backing plate, liquid normally filling said member, said member having at least one opening therein, means normally closing said opening, whereby an impact against said member serves to displace said means normally closing said opening, to permit the escape of at least a portion of said liquid in a quantity and at a rate of escape commensurate with the severity of the impact and the consequent deformation of said body member.

2. The structure of claim 1 wherein said member includes an inwardly extending portion overlying said bumper connecting means and said opening is positioned therein.

3. The structure of claim 2 wherein a plurality of spaced openings are provided along said inwardly extending portion, each being provided with an individual closure member.

4. The structure of claim 3 wherein flexible retaining means connect said closure members and said member.

5. The structure of claim 1 wherein a plurality of openings are provided at spaced intervals along said one longitudinal edge of said member, and the means for closing said openings comprises a frictionally retained plug in each opening.

References Cited by the Examiner
UNITED STATES PATENTS

| | | | |
|---|---|---|---|
| 1,313,282 | 8/1919 | Finnegan | 293—71 |
| 1,402,324 | 1/1922 | Van Gelder | 293—71 |
| 2,650,851 | 9/1953 | Lepponen | 293—69 |
| 2,731,290 | 1/1956 | Corydon | 293—71 |
| 3,097,725 | 7/1963 | Peterson | 213—1 XR |

References Cited by the Applicant
FOREIGN PATENTS 21,998/29    8/1929   Australia.

ARTHUR L. LA POINT, *Primary Examiner.*

H. BELTRAN, *Assistant Examiner.*